United States Patent
Saboo

(10) Patent No.: US 11,632,944 B2
(45) Date of Patent: *Apr. 25, 2023

(54) FLASHLIGHT WITH AN ELECTRONIC INSECT CONTROL SYSTEM

(71) Applicant: West Coast Imports, Inc., Commerce, CA (US)

(72) Inventor: Vinay Saboo, Commerce, CA (US)

(73) Assignee: WEST COAST IMPORTS, INC., Commerce, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/513,825

(22) Filed: Oct. 28, 2021

(65) Prior Publication Data

US 2022/0046908 A1 Feb. 17, 2022

Related U.S. Application Data

(63) Continuation of application No. 16/900,512, filed on Jun. 12, 2020, now Pat. No. 11,160,267, which is a
(Continued)

(51) Int. Cl.
*A01M 1/22* (2006.01)
*F21L 4/02* (2006.01)
*F21Y 115/10* (2016.01)

(52) U.S. Cl.
CPC .............. *A01M 1/223* (2013.01); *F21L 4/025* (2013.01); *F21Y 2115/10* (2016.08)

(58) Field of Classification Search
None
See application file for complete search history.

(56) References Cited

U.S. PATENT DOCUMENTS

| 5,588,739 A | 12/1996 | Nakao |
| D455,513 S | 4/2002 | Galli |

(Continued)

FOREIGN PATENT DOCUMENTS

| CN | 304152418 | 5/2017 |
| EM | 000831268-0001 | 2/2008 |

(Continued)

OTHER PUBLICATIONS

"GLOUE Bug Zapper Light," Jun. 10, 2019 (Q&A), amazon.com, site visited Jun. 16, 2021, URL: https://www.amazon.com/GLOU E-Zapper-Mosquito-Killer-Electronic/dp/B07 RP LZYJ D/ref=sr 1 10?dchi Id=1&keywords= Patio%2C +Lawn+%26+Garden+Insec t+Zappers+Mosquito+Killer+Lannp+Bug+Zapper&qid=1623870983 &s=lawn-garde (Year: 2019).
(Continued)

*Primary Examiner* — Elmito Breval
(74) *Attorney, Agent, or Firm* — Tarter Krinsky & Drogin LLP

(57) ABSTRACT

Exemplary embodiments of a flashlight having an electronic insect control system are provided. In some exemplary embodiments, a flashlight apparatus is provided, having a head portion comprising a first light source, a tail portion, and a body portion between the head portion and tail portion, the body portion comprising an electronic insect control system, the electronic insect control system comprising a frame portion, a second light source provided within the frame portion, and an electrical grid provided within the frame portion and surrounding the second light source, wherein the electrical grid is configured to generate a voltage.

20 Claims, 4 Drawing Sheets

Related U.S. Application Data continuation-in-part of application No. 29/694,652, filed on Jun. 12, 2019, now Pat. No. Des. 929,628.

(60) Provisional application No. 62/939,435, filed on Nov. 22, 2019.

(56) References Cited

U.S. PATENT DOCUMENTS

| | | |
|---|---|---|
| D501,054 S | 1/2005 | Galli |
| D565,220 S | 3/2008 | Galli |
| 7,360,920 B2 | 4/2008 | Dalton |
| D601,737 S | 10/2009 | Swan |
| D606,220 S | 12/2009 | Kim |
| D606,686 S | 12/2009 | Kim |
| D606,687 S | 12/2009 | Kim |
| D619,284 S | 7/2010 | Kim |
| 7,784,963 B2 | 8/2010 | Galli |
| 8,567,556 B2 | 10/2013 | Dueck |
| D709,233 S | 7/2014 | Inskeep |
| 8,973,481 B2 | 3/2015 | Dueck |
| D754,899 S | 4/2016 | Cooper |
| D774,230 S | 12/2016 | Prieto |
| D780,356 S | 2/2017 | Nguyen |
| D804,696 S | 12/2017 | Cheng |
| D811,636 S | 2/2018 | Galli |
| D832,390 S | 10/2018 | Geissele |
| D885,626 S | 5/2020 | Galli |
| 2003/0147239 A1 | 8/2003 | Galli |
| 2004/0105258 A1 | 6/2004 | Galli |
| 2010/0085744 A1 | 4/2010 | Bertken |
| 2012/0033416 A1 | 2/2012 | Ballard |
| 2015/0036330 A1 | 2/2015 | Economos |
| 2016/0013675 A1 | 1/2016 | Workman |
| 2017/0033583 A1 | 2/2017 | Inskeep |
| 2019/0307113 A1 | 10/2019 | Home |
| 2020/0032969 A1 | 1/2020 | Chen |
| 2020/0103094 A1 | 4/2020 | Stevenson |
| 2020/0390078 A1 | 12/2020 | Saboo |

FOREIGN PATENT DOCUMENTS

| | | |
|---|---|---|
| EM | 002753012-0002 | 2/2015 |
| GB | 570169 A1 | 5/1993 |

OTHER PUBLICATIONS https://www.amazon.com/Millennials-Outdoors-Electronic-Mosquito-Outdoor/dp/B07QS343L6/ref=pd_di_sccai4/142-1907619-3348727?pd_rd_w=nnsC2W&pf_rd_p=c9443270-b914-4430-a90b-72e3e7e784e0&pf_rdr=NVY86OZYZ1EM6EWOEG3B&pd_rd_r=aeb9f7e8-f9b4-473a-9903-5fc8a0e6360e&pd_rd_wg=zRObd&pd_rdi=B07OS343L6&psc=1 (Year: 2019).

FLASHLIGHT WITH AN ELECTRONIC INSECT CONTROL SYSTEM

CROSS-REFERENCE TO RELATED APPLICATIONS

This application is a continuation of and claims benefit to U.S. patent application Ser. No. 16/900,512, filed on Jun. 12, 2020, entitled "Flashlight with an Electronic Insect Control System", which relates to and claims priority from U.S. Provisional Patent Application Ser. No. 62/939,435 filed Nov. 22, 2019, and United States Design application No. 29/694,652 filed Jun. 12, 2019, the entire disclosures of which are hereby incorporated herein by reference.

FIELD OF THE DISCLOSURE

The present disclosure relates to exemplary embodiments of a flashlight, and more particularly, to exemplary embodiments of a flashlight having an electronic insect control system.

BACKGROUND INFORMATION

Various flashlights can be provided for outdoor use. When using flashlights in the dark, insects are often attracted to the light which can be bothersome to the user holding the flashlight. The present disclosure relates to a flashlight that can be used as a flashlight while providing an electronic insect control system.

SUMMARY OF EXEMPLARY EMBODIMENTS OF THE DISCLOSURE

Exemplary embodiments of the present disclosure can provide for a flashlight that can have an electronic insect control system, having a light portion at a first end, and an additional light source that provides an electronic insect control system.

For example, in some exemplary embodiments, a flashlight apparatus is provided, comprising a head portion comprising a first light source, a tail portion, and a body portion between the head portion and tail portion, the body portion comprising an electronic insect control system, the electronic insect control system comprising a frame portion, a second light source provided within the frame portion, and an electrical grid provided within the frame portion and surrounding the second light source, wherein the electrical grid is configured to generate a voltage.

In some exemplary embodiments, the flashlight apparatus further comprises one or more batteries configured to power the first light source, second light source and electrical grid. The flashlight apparatus can further comprise a USB port for charging the one or more batteries. In some exemplary embodiments, the first light source comprises a printed circuit board including one or more light emitting diodes, and the second light source comprises a fluorescent lamp. In some exemplary embodiments, the frame portion comprises a plurality of holes providing access to the electrical grid and second light source. In some exemplary embodiments, the electrical grid comprises one or more wires that surround the second light source.

In some exemplary embodiments, the flashlight apparatus further comprises a cover on the body portion, the cover configured to enclose the electronic insect control system. The cover can be a sliding cover that encloses the electronic insect control system in a first position and reveals the electronic insect control system in a second position. In some exemplary embodiments, the flashlight apparatus further comprises a slider provided on the sliding cover configured for a user's finger to slide the sliding cover from the first position to the second position.

In some exemplary embodiments, a flashlight apparatus is provided that comprises a head portion comprising a first light source, a tail portion, a body portion between the head portion and tail portion, the body portion comprising an electronic insect control system, and a sliding cover on the body portion, the sliding cover configured to enclose the electronic insect control system in a first position and reveal the electronic insect control system in a second position. In some exemplary embodiments, the flashlight apparatus further comprises a slider provided on the sliding cover configured for a user's finger to slide the sliding cover from the first position to the second position. In some exemplary embodiments, the electronic insect control system comprises a frame portion, a second light source provided within the frame portion, and an electrical grid provided within the frame portion and surrounding the second light source, wherein the electrical grid is configured to generate a voltage.

In some exemplary embodiments, the flashlight apparatus further comprises one or more batteries configured to power the first light source, second light source and electrical grid. In some exemplary embodiments, the flashlight apparatus further comprises a USB port for charging the one or more batteries. In some exemplary embodiments, the first light source comprises a printed circuit board including one or more light emitting diodes, and the second light source comprises a fluorescent lamp.

In some exemplary embodiments, the frame portion comprises a plurality of holes providing access to the electrical grid and second light source. In some exemplary embodiments, the electrical grid comprises one or more wires provided in a spiral configuration that surround the second light source. In some exemplary embodiments, the body portion is configured to be held in a user's hand.

BRIEF DESCRIPTION OF THE DRAWINGS

The foregoing and other objects of the present disclosure will be apparent upon consideration of the following detailed description, taken in conjunction with the accompanying drawings, and claims, in which like reference characters refer to like parts throughout, and in which:

Figure 1:
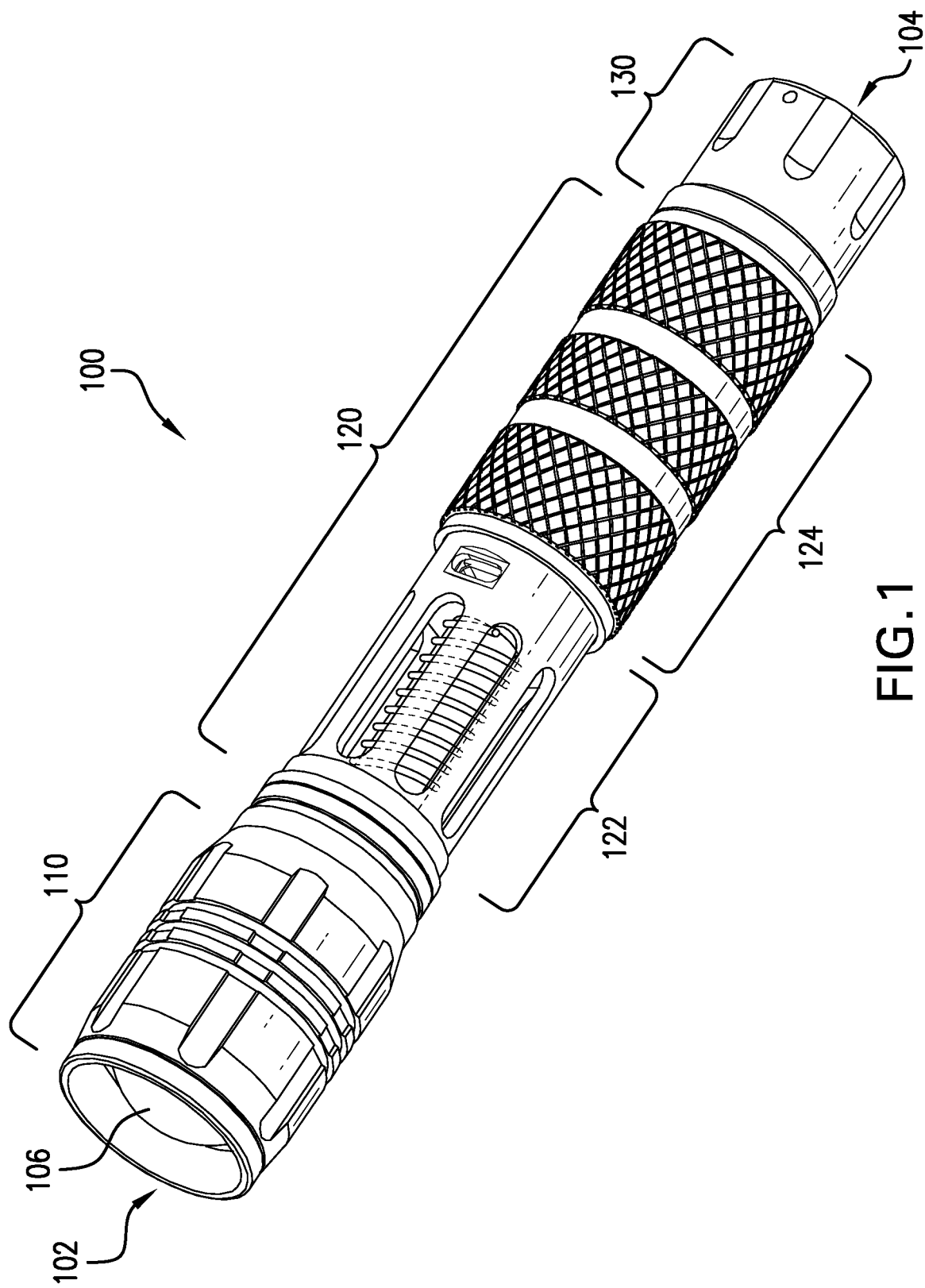
FIG. 1 is a perspective view of a flashlight having an electronic insect control system according to an exemplary embodiment of the present disclosure.

Throughout the figures, the same reference numerals and characters, unless otherwise stated, are used to denote like features, elements, components or portions of the illustrated embodiments. Moreover, while the subject disclosure will now be described in detail with reference to the figures, it is done so in connection with the illustrative embodiments. It is intended that changes and modifications can be made to the described embodiments without departing from the true scope and spirit of the subject disclosure.

DETAILED DESCRIPTION OF EXEMPLARY EMBODIMENTS OF DISCLOSURE

The exemplary embodiments of the present disclosure can provide for a flashlight that can have an electronic insect control system. The flashlight can have a lighting portion at a first end, and an additional light source that attracts insects to an electrical grid ("bug zapper"). The flashlight can be used with the bug zapper portion on or off independently of the light portion at the first end, or solely as a bug zapper. The bug zapper portion can be optionally covered.

Exemplary embodiments of the various methods and apparatuses will now be described with reference to the figures. The following description of the various embodiments is merely exemplary in nature and is in no way intended to limit the scope of the disclosure, its application, or uses.

Figure 2:
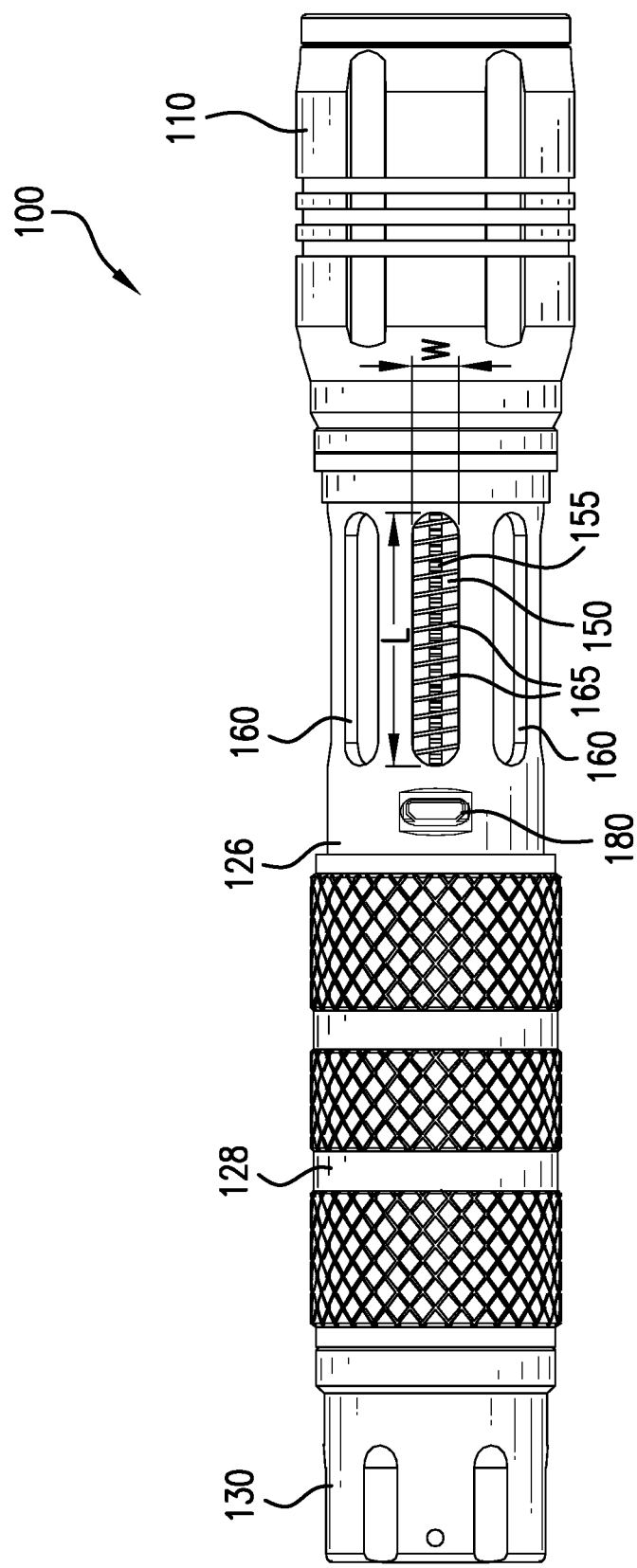
FIG. 2 is a side view of a flashlight having an electronic insect control system according to an exemplary embodiment of the present disclosure.

FIG. 1 is a perspective view of a flashlight 100 and FIG. 2 is a side view of a flashlight 100 having an electronic insect control system 150 according to the exemplary embodiments of the present disclosure. The flashlight 100 can have a head portion 110, a body portion 120 and a tail portion 130. The head portion 110 can include a light 106 on an upper portion thereof. The light 106 can include a lens cover and a light source within for providing a first light at a first end 102 of the flashlight 100. The light source can be one or more light bulbs or any type of light source, such as but not limited to a printed circuit board containing one or more light-emitting diodes. The light source can be provided within the head portion 110. The head portion 110 can be threadably engaged with the body portion 120. The tail portion 130 can be threadably engaged to the body portion 120 at a second end 104, and can include a switch (not shown) at the second end 104, which can be used to turn the light 106 on and off, as well as turn the electronic insect control system on and off, which will be further described below.

The body portion 120 can include an upper body portion 122 and a lower body portion 124. The lower body portion 124 can house one or more batteries for powering the light 106 and the electronic insect control system. The tail portion 130 can be threadably removed from the body portion 120 to insert one or more batteries (e.g., alkaline battery) into the lower body portion 124. In some exemplary embodiments, the batteries within the lower body portion 124 can be rechargeable (e.g., a lithium-ion battery), such that the tail portion 130 may not need to be threadably removable from the body portion 120 to change the one or more batteries.

The body portion 122 can include a frame portion 126 at the upper body portion 122, and a sliding cover 128, shown at the lower body portion 124 in FIGS. 1 and 2. The frame portion 126 can comprise a circular frame and can include an electronic insect control system 150 ("bug zapper"), which can be located internal of and in a center of the frame portion 126. The frame portion 126 can be made of a metal or plastic, but is not limited to any type of material.

The electronic insect control system 150, includes a light source 155 (e.g., a fluorescent lamp) used to attract insects. The light source 155 is surrounded by an electrical grid 165, that can include a wire provided in a spiral configuration around the light source 155. In some exemplary embodiments, the electrical grid 165 can include one or more wires that can be provided in any configuration and can surround the light source 155 such that the light source 155 is visible through the one or more wires. For example, two or more vertical wires can be provided with a distance or gap between the wires such that the light source 155 is visible through the gap. The gap or distance between adjacent wires can be approximately 2 mm. When in a spiral configuration, the distance between adjacent coils 165 as shown in FIG. 2 can be approximately 2 mm. An insect can be electrocuted by touching the wire(s) of the electrical grid 165 that generates a voltage through the wire(s) high enough (e.g., 2000 volts-4,000 volts) to conduct current through the body of an insect and kill the insect. In some exemplary embodiments, two power modes can be provided for generating a lower voltage (e.g., 2000 volts) and a higher voltage (e.g., 4000 volts).

The electrical grid 165 can provide a high-voltage power supply and can be a transformerless voltage multiplier circuit including diodes and capacitors, generating a voltage high enough (e.g., 2500 volts) to conduct current through the body of an insect, but not high enough to spark across the air gap. Enough electric current is provided to flow through the body of the insect to heat it to a high temperature. The impedance of the power supply and the arrangement of the electrical grid 165 is such that it would not drive a dangerous current through the body of a human.

The frame portion 126 can include several holes 160 around the circumference of the frame portion 126, which can be long and narrow elliptical holes 160 as shown in FIGS. 1 and 2. The exemplary embodiments of the present disclosure are not limited to any number, shape or size of the holes 160. In some exemplary embodiments, the number of holes can range from but is not limited to approximately six to ten holes around the circumference of the frame portion 126, and can be eight holes. The holes 160 are designed to have a width large enough to allow insects to fly through the holes 160 but small enough so that a human's fingers cannot be inserted through the holes 160. In some exemplary embodiments, the width W of the holes 160 can range from but is not limited to approximately two to approximately ten millimeters, and preferably approximately four to approximately seven millimeters. The length L of the holes can range from but is not limited to approximately two to approximately four centimeters, and can be approximately three centimeters.

Figure 3:
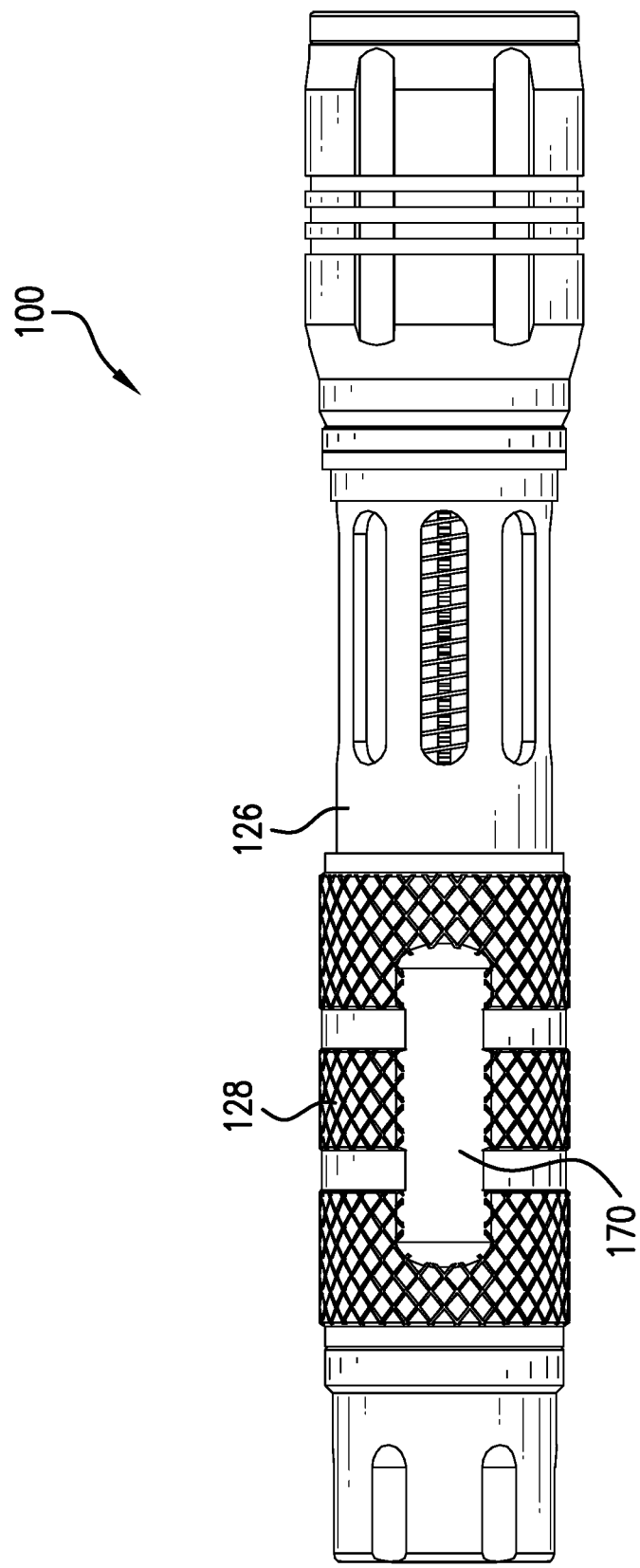
FIG. 3 is a side view of a flashlight having an electronic insect control system in an uncovered configuration according to an exemplary embodiment of the present disclosure.
Figure 4:
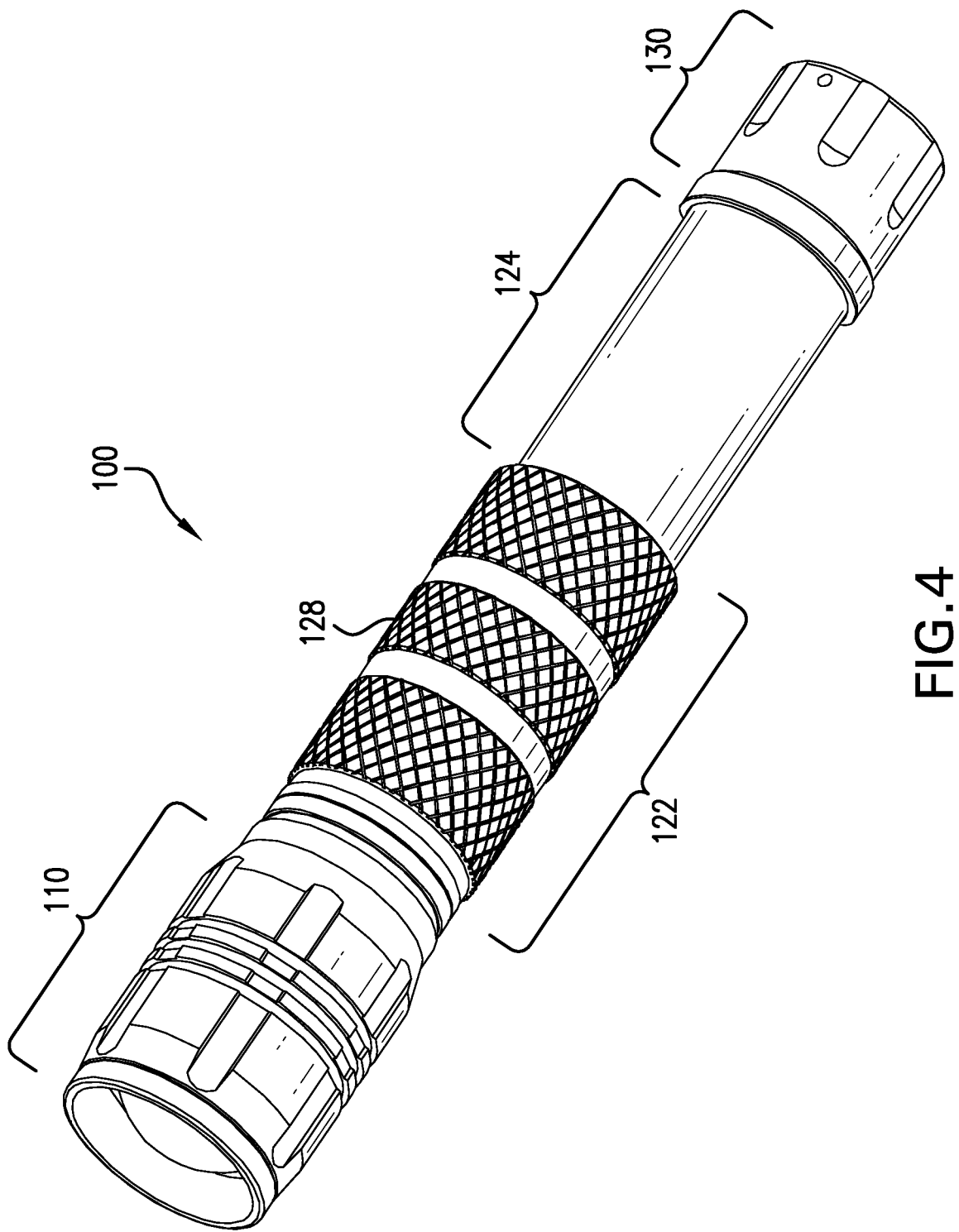
FIG. 4 is a perspective view of a flashlight having an electronic insect control system in a covered configuration according to an exemplary embodiment of the present disclosure.

In some exemplary embodiments, a USB port 180 can be provided to recharge the rechargeable batteries provided in, e.g., the lower body portion 124. Internal circuitry can connect the USB port 180 to the rechargeable batteries inside the flashlight 100. In some exemplary embodiments, a slider 170 can be provided on the sliding cover 128 shown at the lower body portion 124 in FIG. 3. The slider 170 can have a flat configuration where a user can press the slider 170 with their finger and slide the sliding cover 128 over the upper body portion 122, covering the frame portion 126 and electronic insect control system 150, as shown in FIG. 4. A user could use the flashlight 100 solely as a flashlight as shown in FIG. 4 without using the electronic insect control system 150. When desired, the user can slide the sliding cover 128 downward over the lower body portion 124 to use the electronic insect control system 150 of the flashlight 100. In use, the user can sway the flashlight 100 with their hand to kill insects while using the flashlight 100. In some exemplary embodiments, the user can stand the flashlight 100 upright on the tail portion 130, turning the light 106 off while leaving the electronic insect control system 150 (i.e., light source 155 and electrical grid 165) on, to use the flashlight 100 solely as a bug zapper.

A switch (not shown) can be provided on the bottom of the tail portion 130. One switch can be provided to control both the light 106 and the electronic insect control system 150. For example, circuitry can be provided such that pressing the switch once turns only the light 106 on, pressing the switch again turns only the light source 155 and electrical grid 165 on, pressing the switch again turns the light 106, light source 155 and electrical grid 165 on, and pressing it again turns the light 106, light source 155 and electrical grid 165 off. Various configurations of circuitry to operate the light 106 and electronic insect control system 150 are possible and are not limited by the above. In some exemplary embodiments, two switches can be provided on the bottom of the tail portion 130 to operate the light 106 and the electronic insect control system 150 independently. The location of the switches can vary as well, which can be provided on the body portion 120 of the flashlight 100 as well as the tail portion 130 or head portion 110.

Various other considerations can also be addressed in the exemplary applications described according to the exemplary embodiments of the present disclosure. For example, various materials may be used to construct the elements described in the figures. Various sizes and dimensions of the flashlight 100, frame portion 126, electronic insect control system 150 and holes 160 can be provided, and are not limited by the sizes, dimensions, shapes and designs described above and in the figures. In some exemplary embodiments, a dimmer (not shown) can also be provided to dim the light 106 or the light source 155 to vary the brightness of the lights.

Various advantages can be provided based on the exemplary embodiments described above. For example, the flashlight 100 can be used solely as a flashlight, solely as a bug zapper, or both, where the user can use the flashlight 100 while also operating the flashlight as a bug zapper (example, walking at night). The flashlight 100 can be constructed such that it can stand independently on the tail portion 130 or on the head portion 110, such as when the user wants to use the flashlight 100 solely as a bug zapper.

The words "ranging", "ranges from", "ranges between" and other similar notations, are used herein interchangeably and are meant to include the first and second indicated numbers and all the fractional and integral numerals there between. It should be noted that where various embodiments are described by using a given range, the range is given as such merely for convenience and brevity and should not be construed as an inflexible limitation on the scope of the disclosure. Accordingly, the description of a range should be considered to have specifically disclosed all the possible sub-ranges as well as individual numerical values within that range.

The foregoing merely illustrates the principles of the disclosure. Various modifications and alterations to the described embodiments will be apparent to those skilled in the art in view of the teachings herein. It will thus be appreciated that those skilled in the art will be able to devise numerous systems, arrangements, manufacture and methods which, although not explicitly shown or described herein, embody the principles of the disclosure and are thus within the spirit and scope of the disclosure.

What is claimed is:

1. A flashlight apparatus, comprising:
a head portion comprising a first light source;
a tail portion;
a body portion between the head portion and tail portion, the body portion comprising an electronic insect control system, the electronic insect control system comprising:
a circular frame fixedly coupled to the head portion and including a plurality of elongated openings;
a second light source provided within the circular frame; and
an electrical grid comprising one or more wires provided around the second light source within the circular frame, wherein a voltage is generated within the one or more wires; and
a sliding cover provided on the body portion, the sliding cover configured to enclose the electronic insect control system in a first position and reveal the electronic insect control system in a second position.

2. The flashlight apparatus of claim 1, further comprising:
one or more batteries configured to power the first light source, second light source and electrical grid.

3. The flashlight apparatus of claim 2, further comprising:
a USB port for charging the one or more batteries.

4. The flashlight apparatus of claim 1, wherein the first light source comprises a printed circuit board including one or more light emitting diodes.

5. The flashlight apparatus of claim 1, wherein the second light source comprises a fluorescent lamp.

6. The flashlight apparatus of claim 1, wherein the plurality of elongated openings provide access to the electrical grid and second light source.

7. The flashlight apparatus of claim 1, wherein the one or more wires are provided in a spiral configuration around the second light source.

8. The flashlight apparatus of claim 1, wherein the body portion comprises and upper body portion and a lower body portion, and the sliding cover is configured to slide from the lower body portion to the upper body portion to cover the electronic insect control system on the upper body portion.

9. The flashlight apparatus of claim 8, wherein the sliding cover surrounds the lower body portion in the second position and surrounds the upper body portion in the first position.

10. The flashlight apparatus of claim 1, further comprising:
a slider provided on the sliding cover configured for a user's finger to slide the sliding cover.

11. A flashlight apparatus comprising:
a head portion comprising a first light source;
a tail portion;
a body portion between the head portion and tail portion, the body portion comprising an electronic insect control system that is fixedly coupled to the head portion; and
a sliding cover on the body portion, the sliding cover configured to enclose the electronic insect control system when raised from a first position to a second position.

12. The flashlight apparatus of claim 11, further comprising:
a slider provided on the sliding cover configured for a user's finger to slide the sliding cover from the first position to the second position.

13. The flashlight apparatus of claim 11, wherein the electronic insect control system comprises:
a frame portion;
a second light source provided within the frame portion; and an electrical grid provided within the frame portion and surrounding the second light source, wherein the electrical grid is configured to generate a voltage.

14. The flashlight apparatus of claim 13, further comprising:
one or more batteries configured to power the first light source, second light source and electrical grid.

15. The flashlight apparatus of claim 14, further comprising:
a USB port for charging the one or more batteries.

16. The flashlight apparatus of claim 13, wherein the first light source comprises a printed circuit board including one or more light emitting diodes.

17. The flashlight apparatus of claim 13, wherein the second light source comprises a fluorescent lamp.

18. The flashlight apparatus of claim 13, wherein the frame portion comprises a plurality of elongated holes providing access to the electrical grid and second light source.

19. The flashlight apparatus of claim 13, wherein the electrical grid comprises one or more wires provided in a spiral configuration that surround the second light source.

20. The flashlight apparatus of claim 11, wherein the body portion is configured to be held in a user's hand.

* * * * *